United States Patent
Hirata

(10) Patent No.: US 8,382,629 B2
(45) Date of Patent: Feb. 26, 2013

(54) REDUCTION GEAR TRANSMISSION

(75) Inventor: Atsushi Hirata, Tsu (JP)

(73) Assignee: Nabtesco Corporation, Tokyo (JP)

( * ) Notice: Subject to any disclaimer, the term of this patent is extended or adjusted under 35 U.S.C. 154(b) by 1053 days.

(21) Appl. No.: 12/310,074

(22) PCT Filed: Aug. 28, 2007

(86) PCT No.: PCT/JP2007/066620
§ 371 (c)(1),
(2), (4) Date: Feb. 10, 2009

(87) PCT Pub. No.: WO2008/026571
PCT Pub. Date: Mar. 6, 2008

(65) Prior Publication Data
US 2009/0325753 A1    Dec. 31, 2009

(30) Foreign Application Priority Data
Sep. 1, 2006  (JP) ................. 2006-237725

(51) Int. Cl.
*F16H 1/32* (2006.01)
(52) U.S. Cl. ...................................... 475/162
(58) Field of Classification Search ............ 475/162, 475/168, 178
See application file for complete search history.

(56) References Cited

U.S. PATENT DOCUMENTS

| | | | |
|---|---|---|---|
| 4,690,010 A | 9/1987 | Matsumoto et al. | |
| 4,846,018 A | 7/1989 | Matsumoto et al. | |
| 4,928,556 A | 5/1990 | Matsumoto et al. | |
| 5,775,178 A | 7/1998 | Asawa et al. | |
| 5,850,765 A | 12/1998 | Shirasawa | |
| 2002/0066331 A1 | 6/2002 | Okada et al. | |
| 2002/0155915 A1* | 10/2002 | Tanaka | 475/162 |
| 2005/0184265 A1* | 8/2005 | Aoki et al. | 251/248 |

FOREIGN PATENT DOCUMENTS

| | | |
|---|---|---|
| JP | A-62-4586 | 1/1987 |
| JP | A-8-312730 | 11/1996 |
| JP | A-9-89053 | 3/1997 |
| JP | A-2000-186718 | 7/2000 |
| JP | A-2001-353684 | 12/2001 |
| JP | A-2002-106650 | 4/2002 |
| JP | A-2004-92780 | 3/2004 |
| JP | A-2004-92781 | 3/2004 |
| JP | A-2006-71017 | 3/2006 |

* cited by examiner

*Primary Examiner* — David D Le
*Assistant Examiner* — Erin D Bishop
(74) *Attorney, Agent, or Firm* — Oliff & Berridge, PLC

(57) ABSTRACT

A reduction gear transmission capable of realizing a large reduction ratio while preventing both an increase in its diameter and a decrease in the diameter of its through hole, including: a motor gear; an intermediate shaft; a first and second gear; an input shaft; and an external and internal gear. The first and second gears are fixed to the intermediate shaft. The first gear meshes with the motor gear. The input shaft causes an eccentric rotation member to rotate eccentrically with the rotation of the input gear, which meshes with the second gear. The external gear engages the eccentric rotation member, revolving orbitally around an axis line of the input shaft. The internal gear meshes with the external gear, each having a different number of teeth. The motor gear and first gear mesh at a position offset from a straight line formed by connecting an axis line of the intermediate shaft and of the input shaft.

3 Claims, 8 Drawing Sheets

REDUCTION GEAR TRANSMISSION

TECHNICAL FIELD

The present application claims priority to Japanese Patent Application No. 2006-237725 filed on Sep. 1, 2006, the contents of which are hereby incorporated by reference into the present specification.

The present invention relates to a reduction gear transmission. In particular, the present invention relates to a reduction gear transmission that is compact yet is capable of achieving a large reduction ratio.

BACKGROUND ART

Reduction gear transmissions that are compact yet are capable of achieving large reduction ratio are being developed. Japanese Patent Application Publication No. 62-004586 sets forth a reduction gear transmission that comprises a motor, an input shaft, a crankshaft, an external gear, and an internal gear. A motor gear is fixed to an output shaft of the motor. The input shaft extends parallel to the output shaft of the motor, and an input gear and an output gear are formed thereof. The input gear meshes with the motor gear. The crankshaft comprises a gear that meshes with the output gear, and an eccentric rotation member that rotates eccentrically around an axis line of the crankshaft when the aforementioned gear rotates. The external gear comprises a through hole formed at a position offset from a center of the external gear, and outer teeth formed on its outer circumference face. The eccentric rotation member of the crankshaft is inserted into the through hole of the external gear. When the crankshaft rotates, the external gear revolves orbitally around an axis line of the input shaft. The internal gear comprises inner teeth formed on its inner circumference face, and meshes with the outer teeth of the external gear while surrounding the external gear in a state allowing the orbital revolution of the external gear. The number of teeth of the external gear differs from the number of teeth of the internal gear.

In this type of reduction gear transmission, it is possible to freely adjust the reduction ratio by adjusting the number of teeth of the external gear and the number of teeth of the internal gear. As a result, a configuration has been adopted in which adjustment so as to obtain the desired reduction ratio is performed by adjusting the number of teeth of the external gear and the number of teeth of the internal gear, whereas the motor gear fixed to the output shaft of the motor meshes with the input gear fixed to the input shaft.

Similar reduction gear transmissions are also known; whereas these reduction gear transmissions comprise a motor, an input shaft, an ellipsoidal rotation member, an external gear, and an internal gear.

The input shaft extends parallel to an output shaft of the motor. The ellipsoidal rotation member is fixed to the input shaft in a manner that forms an ellipsoid shape when viewed along an axis line of the input shaft. The external gear is capable of changing its shape elastically, and engages at its inner side with an outer face of the ellipsoidal rotation member. The internal gear surrounds the external gear while meshing with the external gear at a position along the major axis of the ellipsoidal rotation member, while allowing the ellipsoidal rotation member to rotate around the axis line of the input shaft. The number of teeth of the external gear differs from the number of teeth of the internal gear.

In this type of reduction gear transmission, the reduction ratio can likewise be adjusted freely by adjusting the number of teeth of the external gear and the number of teeth of the internal gear. As a result, a configuration has been adopted in which adjustment so as to obtain the desired reduction ratio is performed by adjusting the number of teeth of the external gear and the number of teeth of the internal gear, whereas the output shaft of the motor and the input shaft are joined directly together.

In the conventional reduction gear transmission, a reduction gear transmission having the desired reduction ratio is realized by utilizing the fact that the desired reduction ratio can be obtained by adjusting the number of teeth of the external gear and the number of teeth of the internal gear. As a result, additional reduction gear mechanisms besides the external gear and the internal gear are not required, and the configuration in which the output shaft of the motor and the input shaft are joined directly together is adopted. Alternatively, the configuration in which the motor gear fixed to the output shaft of the motor meshes with the input gear of the input shaft is adopted.

DISCLOSURE OF INVENTION

Problem to be Solved by the Invention

As the number of rotation that motors make is increased, there is a demand for reduction gear transmissions having a greater reduction ratio. It is possible to obtain a greater reduction ratio by increasing the number of teeth of the internal gear and decreasing the difference in the number of teeth between the internal gear and the external gear. However, in such a configuration, the outer diameter of the reduction gear transmission is undesirably increased.

Alternatively, it is also possible to increase the reduction ratio of the reduction gear transmission by increasing the reduction ratio obtained by the motor gear and the input gear of the input shaft, or by increasing the reduction ratio obtained by the output gear of the input shaft and the gear (a crankshaft gear) fixed to the crankshaft.

Meanwhile, in the case with a joint of a robot arm containing a reduction gear transmission, it is necessary to form a through hole in the input shaft of the reduction gear transmission which extends along an axis line of the input shaft, and into which wiring or tubing, etc. is passed through. However, when the increase in the diameter of the through hole while not increasing the diameter of the reduction gear transmission is desired, it is difficult to increase the reduction ratio from the motor gear to the crankshaft gear via the input gear.

In the prior art, increase in the diameter of the reduction gear transmission or decrease in the diameter of the through hole is unavoidable in the case where a large reduction ratio is required. The technique of the present invention is designed to solve this problem; a technique in which a large reduction ratio can be realized without increasing the diameter of the reduction gear transmission or decreasing the diameter of the through hole is herein provided.

Means to Solve the Problem

A reduction gear transmission of the present invention comprises a motor gear, an intermediate shaft, a first gear, a second gear, an input shaft, an external gear, and an internal gear.

The motor gear is fixed to an output shaft of the motor. The intermediate shaft extends parallel to the motor shaft. The first gear is fixed to the intermediate shaft and meshes with the motor gear. The second gear is fixed to the intermediate shaft. The input shaft extends parallel to the output shaft of the motor. A through hole that extends along an axis line of the input shaft is formed in the input shaft. Further, an input gear is fixed to the input shaft. The input gear meshes with the second gear. When the input gear rotates, an eccentric rotation member rotates eccentrically. The external gear has a center through hole formed in its center position. The external gear engages at its inner side with the eccentric rotation member. The external gear revolves orbitally around the axis line of the input shaft when the input shaft rotates. The internal gear surrounds the external gear while meshing with the external gear and allowing the orbital revolution of the external gear. The number of teeth of the external gear differs from the number of teeth of the internal gear.

The motor gear and the first gear mesh at a position which is offset from a straight line formed by connecting an axis line of the intermediate shaft and the axis line of the input shaft.

According to above reduction gear transmission, the reduction gear mechanism is formed by a row of gears that links from the motor gear to the input gear via the first gear and the second gear. That is, in addition to the reduction gear mechanism that utilizes the external gear and the internal gear having a differing number of teeth, a reduction gear mechanism that links from the motor gear to the input gear via the first gear and the second gear is utilized. According to this configuration, a large reduction ratio can be realized without increasing the diameter of the reduction gear transmission or decreasing the diameter of the through hole.

This device is equivalent to a combination of a reduction gear mechanism that utilizes an external gear and an internal gear having a differing number of teeth and another reduction gear mechanism added thereto. However, this reduction gear transmission should not be assessed merely as a combination of a conventional reduction gear mechanism and an additional reduction gear mechanism. In the conventional technique, for the purpose of obtaining the requisite reduction ratio, the reduction gear mechanism that utilizes an external gear and an internal gear having a differing number of teeth is basically employed, and other reduction gear mechanisms are not utilized. The conventional technique pursues the advantage that, since additional reduction gear mechanisms are not required, the configuration of the reduction gear transmission is simplified and the reduction gear transmission can be manufactured at low cost.

In contrast, the reduction gear transmission of the present invention opposes this technical trend; and utilizes an additional reduction gear mechanism. When the additional reduction gear mechanism opposing the aforementioned technical trend is utilized, the configuration of the reduction gear transmission would normally become more complex and the diameter of the reduction gear transmission would increase as the consequence thereof. However, it is possible to realize a reduction gear transmission that is capable of realizing a large reduction ratio without increasing the diameter of the reduction gear transmission or decreasing the diameter of the through hole, by utilizing the reduction gear mechanism set forth herein that contains a row of gears that links from the motor gear to the input gear via the first gear and the second gear, and by disposing the motor gear and the first gear with a positional relationship such that the motor gear and the first gear mesh at a position which is offset from a straight line formed by connecting the axis line of the intermediate shaft and the axis line of the input shaft.

Since this reduction gear transmission has a large reduction ratio, it is possible to use a small, high velocity motor for a joint of a robot arm if the reduction gear transmission of the present invention is utilized in the joint of the robot arm. Moreover, it is possible to realize a thin robot arm by employing this reduction gear transmission having a small outer diameter. Furthermore, it is possible to realize a joint that is capable of passing through a plurality of wiring or tubing, etc.

Furthermore, a reduction gear transmission of a specific embodiment of the present invention may comprise a crankshaft. The crankshaft extends parallel to the input shaft. A fourth gear may be formed on the crankshaft. A third gear may be formed on an outer circumference face of the input shaft, whereas this third gear may mesh with the fourth gear. A second through hole may be formed in the external gear at a position offset from a center of the external gear. The crankshaft may pass through the second through hole. The eccentric rotation member may be formed on the crankshaft. The eccentric rotation member may engage with the external gear at an inner side of the second through hole.

According to this reduction gear transmission, speed can also be reduced between the third gear and the fourth gear. A reduction ratio greater than, for example, $1/350$ can be obtained more effectively without increasing the size of the reduction gear transmission.

In a reduction gear transmission of another specific embodiment of the present invention, the eccentric rotation member may be formed on the input shaft. This eccentric rotation member may engage with the external gear at an inner side of the center through hole.

Since the eccentric rotation member is formed on the input shaft, a bearing for rotatably supporting the input shaft and a bearing for supporting the eccentric rotation member such that the eccentric rotation member is capable of rotating around the axis line of the input shaft can be commonly utilized. The number of components comprising the reduction gear transmission can thus be reduced, and consequently a low cost reduction gear transmission can be realized.

The present invention also sets forth another type of reduction gear transmission. This reduction gear transmission comprises a motor gear, an intermediate shaft, a first gear, a second gear, an input shaft, an external gear, and an internal gear.

The motor gear is fixed to an output shaft of the motor. The intermediate shaft extends parallel to the output shaft of the motor. The first gear is fixed to the intermediate shaft, and meshes with the motor gear. The second gear is fixed to the intermediate shaft. The input shaft is supported so as to be capable of rotating around an axis line extending parallel to the output shaft of the motor. A through hole that extends along an axis line of the input shaft is formed in the input shaft. Further, an input gear that meshes with the second gear and an ellipsoidal rotation member that is perpendicular to the axis line of the input shaft are formed on an outer circumference face of the input shaft. The external gear engages with an outer circumference face of the ellipsoidal rotation member, and is capable of flexibly changing its shape. The internal gear meshes with the external gear at a position along the major axis of the ellipsoidal rotation member. Further, the internal gear surrounds the external gear while allowing the ellipsoidal rotation member to rotate around the axis line of the input shaft. The number of teeth of the external gear differs from the number of teeth of the internal gear. The motor gear and the first gear mesh at a position which is offset from a straight line formed by connecting an axis line of the intermediate shaft and the axis line of the input shaft.

In this reduction gear transmission, the position at which the external gear and the internal gear mesh is changed by the ellipsoidal rotation member rotating around the axis line of the input shaft. The external gear rotates relatively to the internal gear around the axis line of the input shaft, in a rotation that is caused by the external gear and the internal gear having a differing number of teeth. Also in this type of reduction gear transmission, it is possible to realize a large reduction ratio while preventing an increase in the diameter of the reduction gear transmission and a decrease in the diameter of the through hole by means of embedding a reduction gear mechanism that links from the motor gear to the input gear via the first gear and the second gear.

In the reduction gear transmission of the present invention, it is preferred that the motor, the first gear, and the second gear are arranged within a range that is outwards from the through hole formed in the input shaft and is within the outer diameter of the internal gear.

According to this reduction gear transmission, it is possible to prevent an increase in the diameter of the reduction gear transmission and a decrease in the diameter of the through hole by means of ensuring a space for housing the motor, the first gear, and the second gear.

Effects of the Invention

According to the present invention, a plurality of wiring or tubing, etc. can pass through the interior of the reduction gear transmission. A large reduction ratio can be obtained without increasing the size of the reduction gear transmission. It is possible to manufacture a compact industrial robot utilizing this reduction gear transmission.

MODES FOR CARRYING OUT THE INVENTION

Embodiments of the Invention

Some of the features of the present embodiments will be described below.

(First feature) In a reduction gear transmission of first to third embodiments, angular ball bearings may be disposed between an internal gear and a carrier. The carrier may be supported by the angular ball bearings so as to be capable of rotating with respect to the internal gear and so as to be incapable of moving in its axial direction.

(Second feature) In the reduction gear transmission of first to third embodiments, a portion of the carrier may pass through an interior of a second through hole formed in an external gear.

(Third feature) In a reduction gear transmission of fourth embodiment, an internal gear and a carrier may be formed integrally.

(Fourth feature) A dimple that is used to fix the position of a member for supporting the first gear and the second gear may be formed in the internal gear.

Embodiments will be described in detail below with reference to the drawings.

First Embodiment

Figure 1:
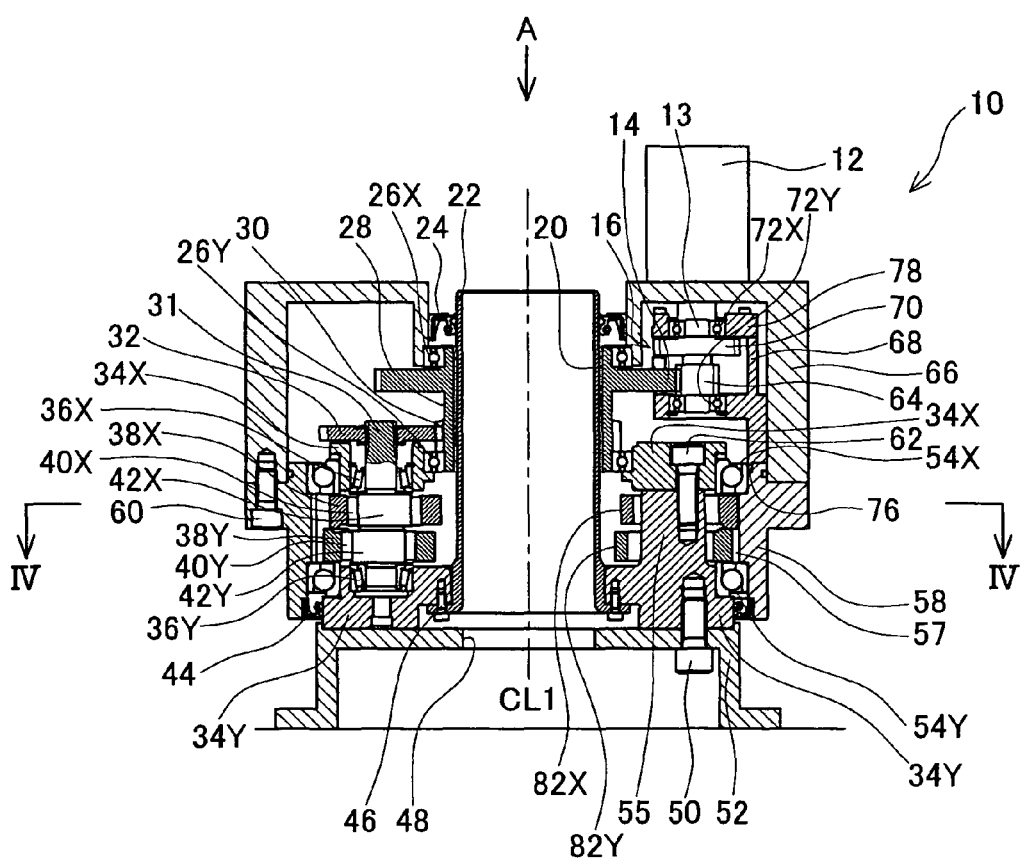
FIG. 1 shows a cross-sectional view of a reduction gear transmission of a first embodiment.
Figure 2:
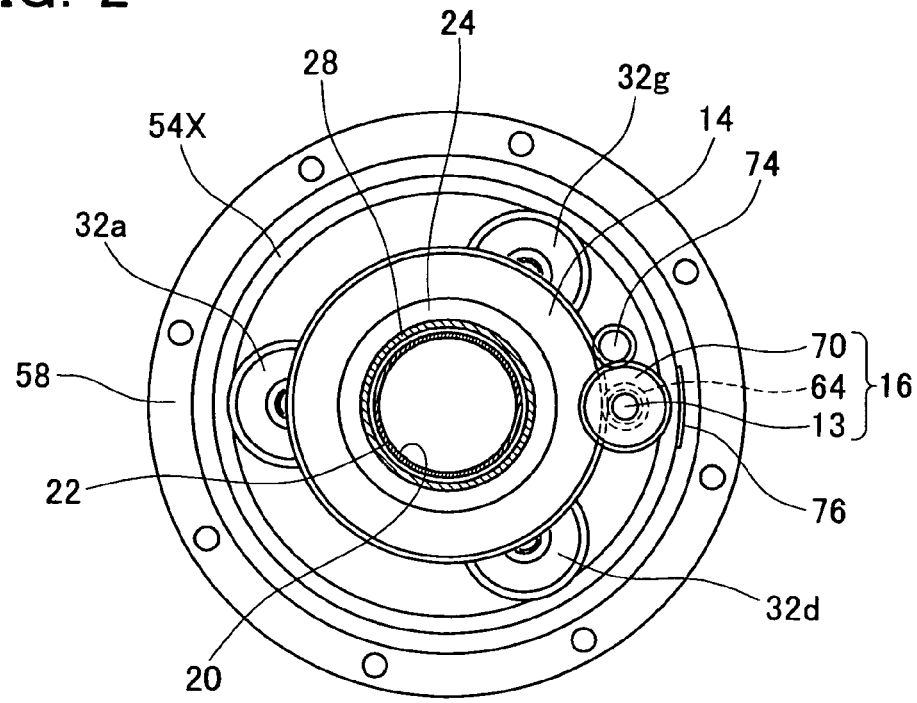
FIG. 2 shows a plan view of the reduction gear transmission of the first embodiment (a support member has been abbreviated).
Figure 3:
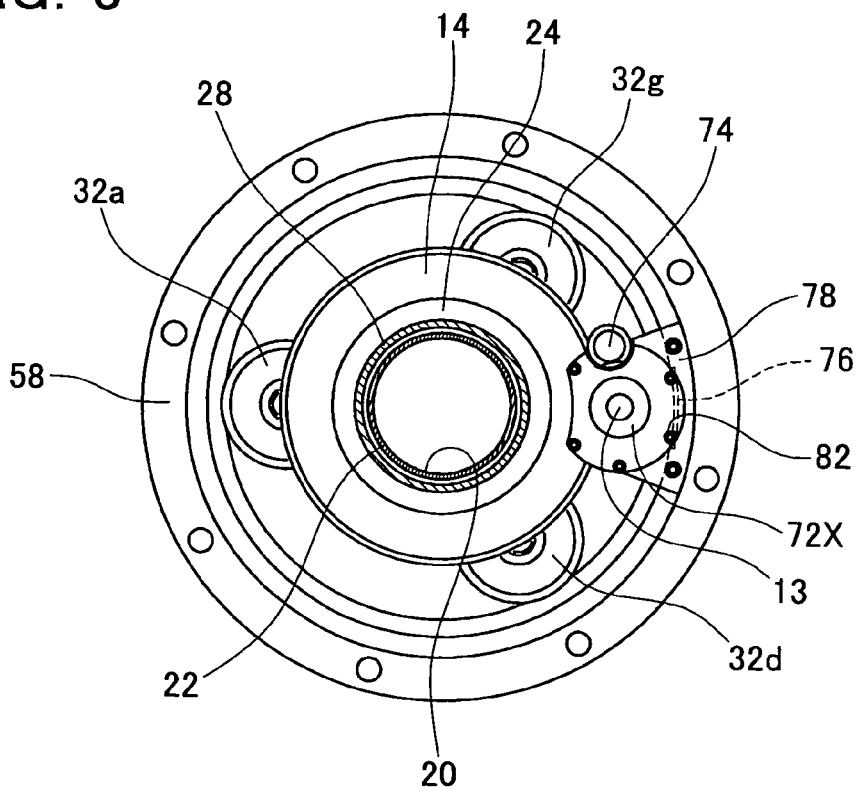
FIG. 3 shows another plan view of the reduction gear transmission of the first embodiment.
Figure 4:
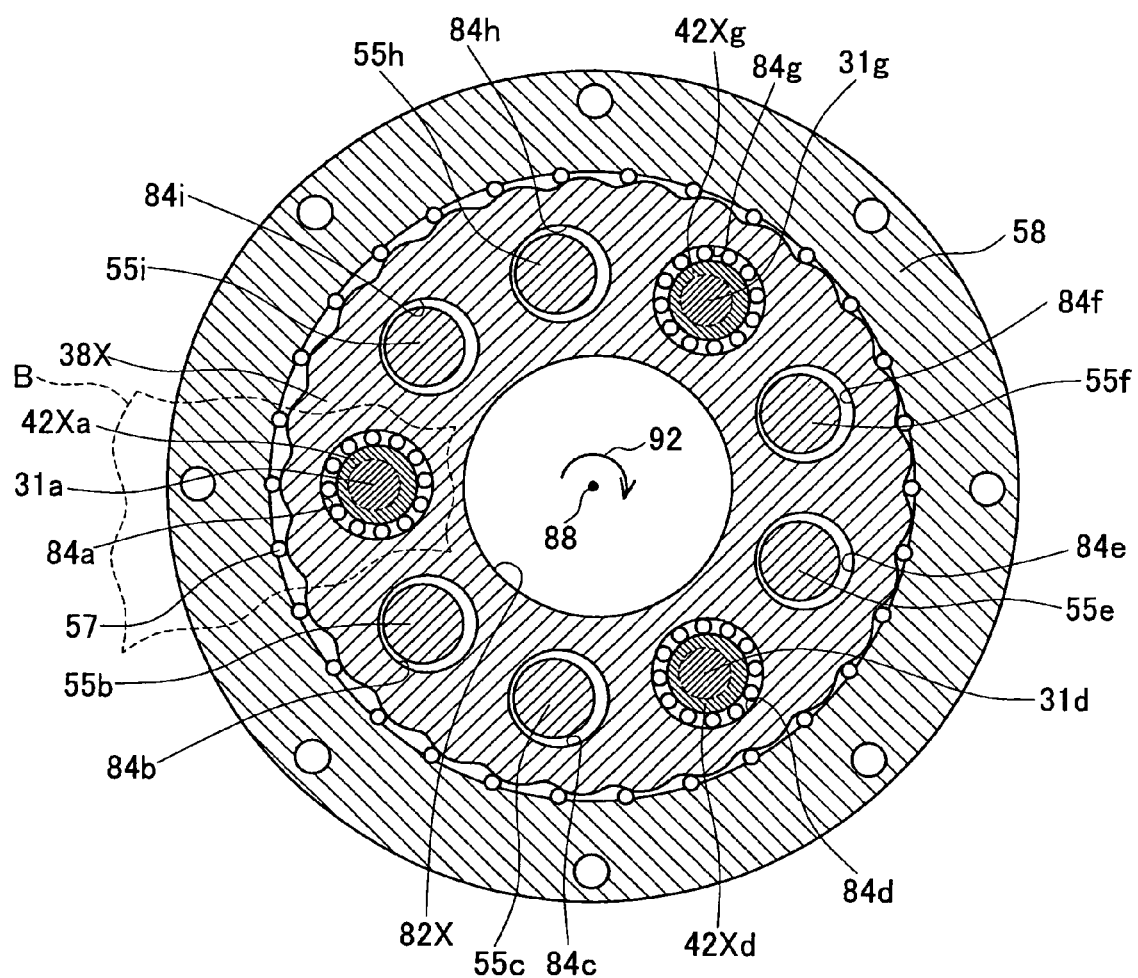
FIG. 4 shows a cross-sectional view along the line IV-IV of FIG. 1.
Figure 5:
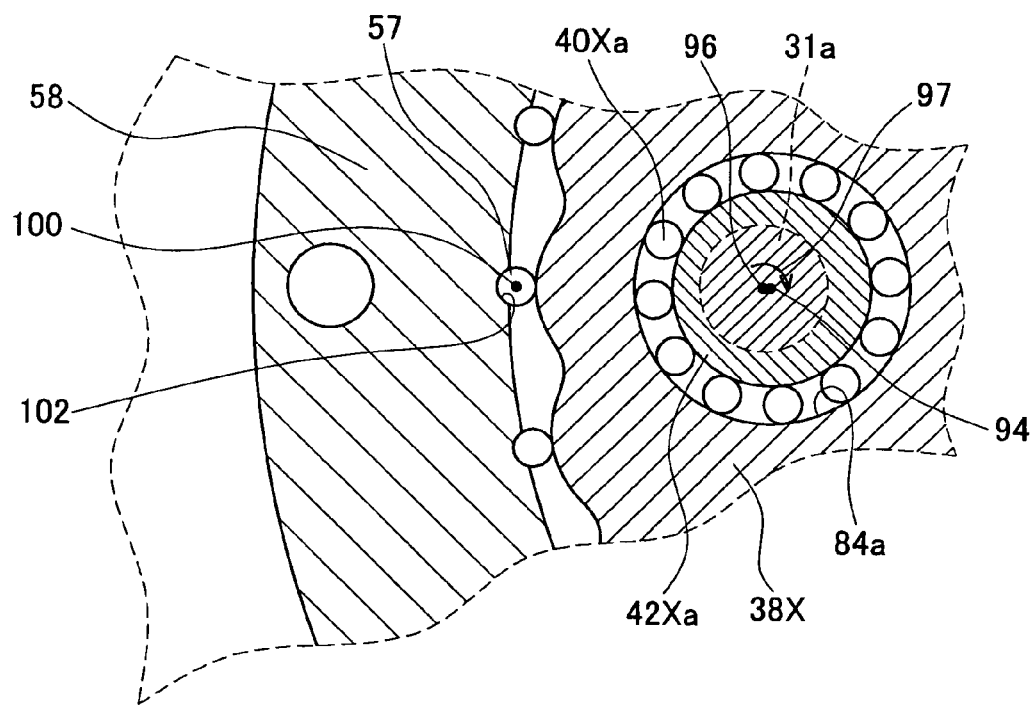
FIG. 5 shows an expanded view of an area surrounded by a broken line B in FIG. 4.

FIG. 1 shows a schematic cross-sectional view of a reduction gear transmission 10 of the present embodiment. FIGS. 2 and 3 respectively shows a schematic plan view viewed from the arrow A in FIG. 1, in which a motor 12 and a casing 66 have been removed from the reduction gear transmission 10. FIG. 2 shows the plan view in which a support member 78 (to be described) of FIG. 3 has been removed. FIG. 4 shows a schematic cross-sectional view along the line IV-IV of FIG. 1. FIG. 5 shows an expanded view of an area B surrounded by the broken line in FIG. 4.

As shown in FIG. 1, the reduction gear transmission 10 comprises a motor gear 74 (described later, cf. FIG. 2), an intermediate shaft 13, a first gear 70, a second gear 64, an input shaft 28, external gears 38X and 38Y, and an internal gear 58. The motor gear 74 is fixed to an output shaft (not shown) of the motor 12. The intermediate shaft 13 extends parallel to the output shaft of the motor 12. The first gear 70 and the second gear 64 are fixed to the intermediate shaft 13. The first gear 70 meshes with the motor gear 74 (see FIG. 2). The second gear 64 is disposed coaxially with the first gear 70 on the intermediate shaft 13. The second gear 64 rotates together with the first gear 70. The input shaft 28 is supported so as to be capable of rotating around an axis line CL 1 extending parallel to the output shaft of the motor 12. A through hole that extends along the axis line CL 1 is formed in the input shaft 28. An input gear 14 that meshes at its outer circumference face with the second gear 64 is formed on the input shaft 28. A third gear 30 is formed on an outer circumference face of the input shaft 28. Center through holes 82X and 82Y are formed in center positions of the external gears 38X and 38Y. Second through holes 84a to 84i (described later, cf. FIG. 4) are formed in the external gears 38X and 38Y at a position offset from a center of the external gears 38X and 38Y. Outer teeth are formed on outer circumference faces of the external gears 38X and 38Y. The crankshaft 31 passes through the second through holes 84a to 84i. A fourth gear 32 that meshes with the third gear 30, and eccentric rotation members 42X and 42Y are formed on the crankshaft 31. When the input shaft 28 rotates around the axis line CL 1 with the rotation of the input gear 14, the eccentric rotation members 42X and 42Y rotate eccentrically around an axis line of the crankshaft 31. The eccentric rotation members 42X and 42Y engage inside the respective second through holes 84a to 84i. As a result, when the eccentric rotation members 42X and 42Y rotate eccentrically, the external gears 38X and 38Y revolve orbitally around the input shaft 28.

The internal gear 58 surrounds the external gears 38X and 38Y such that the internal gear 58 meshes with outer teeth of the external gears 38X and 38Y and the external gears 38X and 38Y are allowed to revolve orbitally. Although this will be described below, the number of teeth of the external gears 38X and 38Y differs from the number of teeth of the internal gear 58.

A through hole is formed in a center position of the input shaft 28, and a cylindrical member 22 passes through the through hole. A through hole 20 is formed in a center position of the cylindrical member 22. The cylindrical member 22 is fixed to the carrier 34Y by bolts 46. Moreover, a gap (see also FIG. 2) is kept between the cylindrical member 22 and the input shaft 28, and the input shaft 28 is capable of rotating around the cylindrical member 22.

As shown in FIG. 2, the motor gear 74 and the first gear 70 mesh at a position offset from a straight line joining an axis line of the input shaft 28 and a coaxial line of both the first gear 70 and the second gear 64 (that is, an axis line of the intermediate shaft 13). Since the first gear 70 and the second gear 64 are fixed by the intermediate shaft 13 (see also FIG. 1), the first gear 70 and the second gear 64 rotate together. In the present specification, the combination of the first gear 70, the second gear 64, and the intermediate shaft 13 may be termed a combination gear 16. Moreover, in the present specification, for the sake of clarity in the drawings, outer teeth of the gears 74, 64, 70, 14, and fourth gears 32a, 32d, 32g (to be described later) are each shown with doubled circle.

As shown in FIG. 1, the third gear 30 meshes with the fourth gear 32. The fourth gears 32a, 32d, and 32g shown in FIG. 2 are the fourth gear 32 shown in FIG. 1. That is, the reduction gear transmission 10 has three fourth gears 32, and the third gear 30 meshes with all of the fourth gears 32a, 32d, and 32g. The fourth gears 32a, 32d, and 32g are disposed around the axis line CL 1 of the input shaft 28 and are separated from one another by 120 degrees.

In the reduction gear transmission 10 of the present embodiment, the motor 12, the first gear 70, and the second gear 64 are housed in a range that is outside of the through hole formed in the input shaft 28 and inside of the outer diameter of the internal gear 58.

According to the reduction gear transmission 10, it is possible to prevent increase in the diameter of the gear transmission 10 and decrease in the diameter of the through hole of the input shaft 28 by ensuring a space for housing the motor 12, the first gear 70, and the second gear 64.

As shown in FIG. 2, a dimple 76 is formed in a part of the internal gear 58. The dimple 76 can fix support members 68 and 78 (see FIG. 1) that support the combination gear 16 at a predetermined position. As shown in FIG. 1, the combination gear 16 (the first gear 70, the second gear 64, and the intermediate shaft 13) is supported by the support members 68 and 78, and a pair of deep groove ball bearings 72X and 72Y are disposed between the intermediate shaft 13 of the combination gear 16 and the support members 68 and 78. The combination gear 16 is supported by the pair of deep groove ball bearings 72X and 72Y so as to be capable of rotating with respect to the support members 68 and 78. As shown in FIG. 3, the support member 78 is fixed to the support member 68 by a bolt 82. The position of the combination gear 16 can be fixed by fitting the support member 68 into the dimple 76 formed in the internal gear 58. A notch is formed in the upper support member 78 that is disposed on the motor gear 74, and the motor gear 74 is fixed to an output shaft (not shown) of the motor 12.

Figure 7:
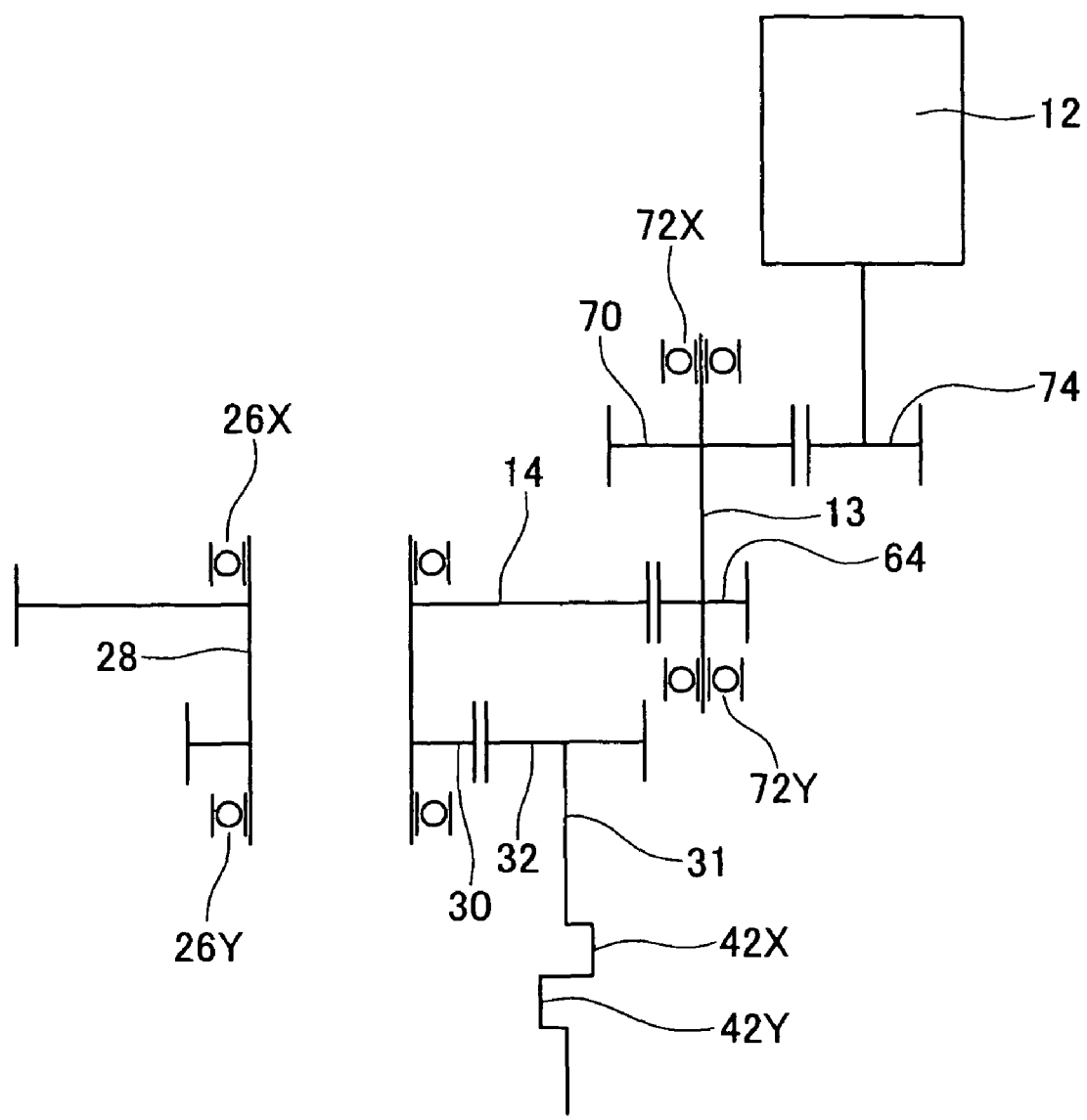
FIG. 7 shows a torque transmission line circuit of the reduction gear transmission of the first embodiment.

The reduction gear transmission 10 has four speed changing portions (whereas the 'speed change' includes speed reduction, speed acceleration, and constant velocity). First to third speed changing portions of the reduction gear transmission 10 will be described with reference to FIG. 7. FIG. 7 shows a schematic torque transmission line circuit of the motor 12. Outputted torque from the motor 12 rotates the motor gear 74. First speed change can be obtained when the rotation of the motor gear 74 is transmitted to the first gear 70. The first gear 70 and the second gear 64 are fixed by the intermediate shaft 13, and the first gear 70 and the second gear 64 rotate at the same speed. Second speed change can be obtained when the rotation of the second gear 64 is transmitted to the input gear 14. The input gear 14 and the third gear 30 are fixed by the input shaft 28, and the input gear 14 and the third gear 30 rotate at the same speed. Third speed change can be obtained when the rotation of the third gear 30 is transmitted to the fourth gear 32. The fourth gear 32 rotates around the axis line of the crankshaft 31. When the crankshaft 31 rotates, eccentric plate members 42X and 42Y rotate eccentrically around the axis line of the crankshaft 31, whereupon fourth speed change can be obtained.

The fourth speed change of the reduction gear transmission 10 will now be described. The fourth speed change can be obtained by the external gears 38X and 38Y meshing with the internal gear 58 while revolving orbitally around the axis line CL 1 of the input shaft 28. As shown in FIG. 1, the reduction gear transmission 10 comprises the crankshaft 31. The eccentric rotation members 42X and 42Y that rotate around the axis line of the fourth gear 32 (that is, around the axis line of the crankshaft 31) are formed in the crankshaft 31. The external gears 38X and 38Y engage with the eccentric rotation members 42X and 42Y. The internal gear 58 surrounds the external gears 38X and 38Y. Although this will be described in detail later, the internal gear 58 has a number of teeth differing from the number of teeth of the external gears 38X and 38Y respectively.

The crankshaft 31 is supported by a pair of tapered roller bearings 36X and 36Y so as to be capable of rotating with respect to the carriers 34X and 34Y. The crankshaft 31 is also supported by the tapered roller bearings 36X and 36Y so as to be incapable of moving in its axial direction. When the crankshaft 31 rotates, the eccentric rotation members 42X and 42Y rotate eccentrically around the axis line of the crankshaft 31. The carrier 34X and the carrier 34Y are fixed by bolts 62. The carrier 34X and the carrier 34Y are supported by a pair of angular ball bearings 54X and 54Y so as to be capable of rotating with respect to the internal gear 58. Further, the carrier 34X and the carrier 34Y are supported by the pair of angular ball bearings 54X and 54Y so as to be incapable of moving in their axial direction. Below, the combination of the carrier 34X and the carrier 34Y may be termed a carrier 34. A column-shaped part 55 is formed on a part of the carrier 34. The column-shaped part 55 passes through the respective through hole formed in a position offset from a center of the external gears 38X and 38Y.

FIG. 4 shows a cross-sectional view along the line IV-IV of FIG. 1. However, the cylindrical member 22 has not been shown. As shown in FIG. 4, nine second through holes 84a to 84i are formed along a circumference direction of the external gear 38X. The second through holes 84a to 84i are each formed in a position offset from the center of the external gear 38X. Six column-shaped parts 55b, 55c, 55e, 55f, 55h, and 55i formed on the carrier 34 are inserted respectively into the second through holes 84b, 84c, 84e, 84f, 84h, and 84i of the external gear 38X.

FIG. 5 shows an expanded view of an area surrounded by a broken line B in FIG. 4. The number 42Xa shows an eccentric rotation member formed on a crankshaft 31a. The cross sectional outer shape of the eccentric rotation member 42Xa is round, and its center 94 is offset from an axis line 96 of the crankshaft 31a. The eccentric rotation member 42Xa engages with the second through hole 84a of the external gear 38X via a needle shaped roller bearings 40Xa. When the crankshaft 31a rotates around the axis line 96, the center 94 of the eccentric rotation member 42Xa revolves orbitally around the axis line 96 of the crankshaft 31a as shown by the arrow 97. When the center 94 of the eccentric rotation member 42Xa revolves orbitally as shown by the arrow 97, the external gear 38X revolves orbitally around a center 88 (see FIG. 4) of the internal gear 58 as shown by the arrow 92. The radius of orbital revolution of the arrows 92 and 97 is shown larger than it actually is. The actual radius of orbital revolution is identical with the offset distance between the center 94 of the eccentric rotation member 42Xa and the axis line 96 of the crankshaft 31a.

42Xd and 42Xg shown in FIG. 4 are eccentric rotation members. The eccentric rotation members 42Xd and 42Xg have the same operation and effects as the eccentric rotation member 42Xa, and consequently a description thereof has been omitted. 31d and 31g are crankshafts. The crankshafts 31d and 31g have the same operation and effects as the crankshaft 31a, and consequently a description thereof has been omitted. Moreover, the crankshaft 31a and the eccentric rotation member 42Xa are composed as one integral member, but separate oblique lines have been added in order to make it easier to distinguish the two. Separate oblique lines have also been added to the crankshaft 31d and the eccentric rotation member 42Xd, and to the crankshaft 31g and the eccentric rotation member 42Xg.

The external gear 38X has twenty-nine teeth (outer teeth), and the internal gear 58 has thirty teeth (inner teeth). That is, the external gear 38X has one less tooth than the internal gear 58. The external gear 38X is capable of revolving orbitally around the axis line 88 of the internal gear 58 as shown by the arrow 92 while the outer teeth of the external gear 38X and inner gear pins 57 of the internal gear 58 are in a meshed state. The inner gear pins 57 are not fixed to the internal gear 58, but are each disposed in a groove 102 (see FIG. 5) formed in the internal gear 58. The inner gear pins 57 are capable of rotating around their axis line 100. This relationship is mutual for all thirty inner gear pins 57 formed in the internal gear 58.

A gap that allows the orbital revolution 92 of the external gear 38X is maintained between the column-shaped part 55b and the second through hole 84b of the external gear 38X. Gaps that allow the orbital revolution 92 of the external gear 38X are also maintained between the column-shaped part 55c and the second through hole 84c of the external gear 38X, between the column-shaped part 55e and the second through hole 84e of the external gear 38X, between the column-shaped part 55f and the second through hole 84f of the external gear 38X, between the column-shaped part 55h and the second through hole 84h of the external gear 38X, and between the column-shaped part 55i and the second through hole 84i of the external gear 38X. In the reduction gear transmission 10 of the present embodiment, the carrier 34 is fixed to a pedestal 52 (see FIG. 1) by bolts 50. That is, the rotation of the external gear 38X is thereby restricted. As a result, when the crankshaft 31 rotates, the external gear 38X revolves orbitally around the axis line 88 of the internal gear 58, but does not rotate. Since there is the difference by one tooth in the number of teeth of the external gear 38X and that of the internal gear 58, whereas the internal gear 58 has thirty teeth, the internal gear 58 makes one rotation for each 30 orbital revolutions made by the external gear 38X around the axis line 88.

A through hole 48 is formed in a central portion of the pedestal 52. A center through hole 82X is formed in a central portion of the external gear 38X, and the cylindrical member 22 (see FIG. 1) passes through the center through hole 82X. The through hole 20 is formed in the cylindrical member 22. Wiring, tubing, etc. can be passed through the through holes 48 and 20.

The above description is applied to the external gear 38Y likewise; with the exception that the direction of being offset from the axis line 88 is in the opposite direction. In the state shown in FIG. 4 and FIG. 5, the center 94 of the eccentric rotation member 42Xa of the external gear 38X is offset from the axis line 96 of the crankshaft 31a. The center 94 of the eccentric rotation member 42Xa for the external gear 38X and a center of the eccentric rotation member 42Ya (not shown) for the external gear 38Y are positioned symmetrically with the axis line 96 of the crankshaft 31a positioned between the two. That is, the external gear 38X and the external gear 38Y are positioned symmetrically with respect to the axis line 96, and a relationship in which rotational balance is ensured is thereby realized.

As shown in FIG. 1, the internal gear 58 and the casing 66 are fixed by a bolt 60, and a configuration is formed in which parts of the reduction gear transmission 10 do not protrude to the exterior. A deep groove ball bearing 26X is disposed between the input shaft 28 and the casing 66, and a deep groove ball bearing 26Y is disposed between the input shaft 28 and the carrier 34. The input shaft 28 is thus supported so as to be capable of rotating with respect to the casing 66 and the carrier 34.

An oil seal 24 is disposed between the cylindrical member 22 and the casing 66. An oil seal 44 is disposed between the carrier 34Y and the internal gear 58. Oil that has been inserted into the interior of the reduction gear transmission 10 can be prevented from leaking to the exterior of the reduction gear transmission 10 by the oil seals 24 and 44.

Second Embodiment

Figure 6:
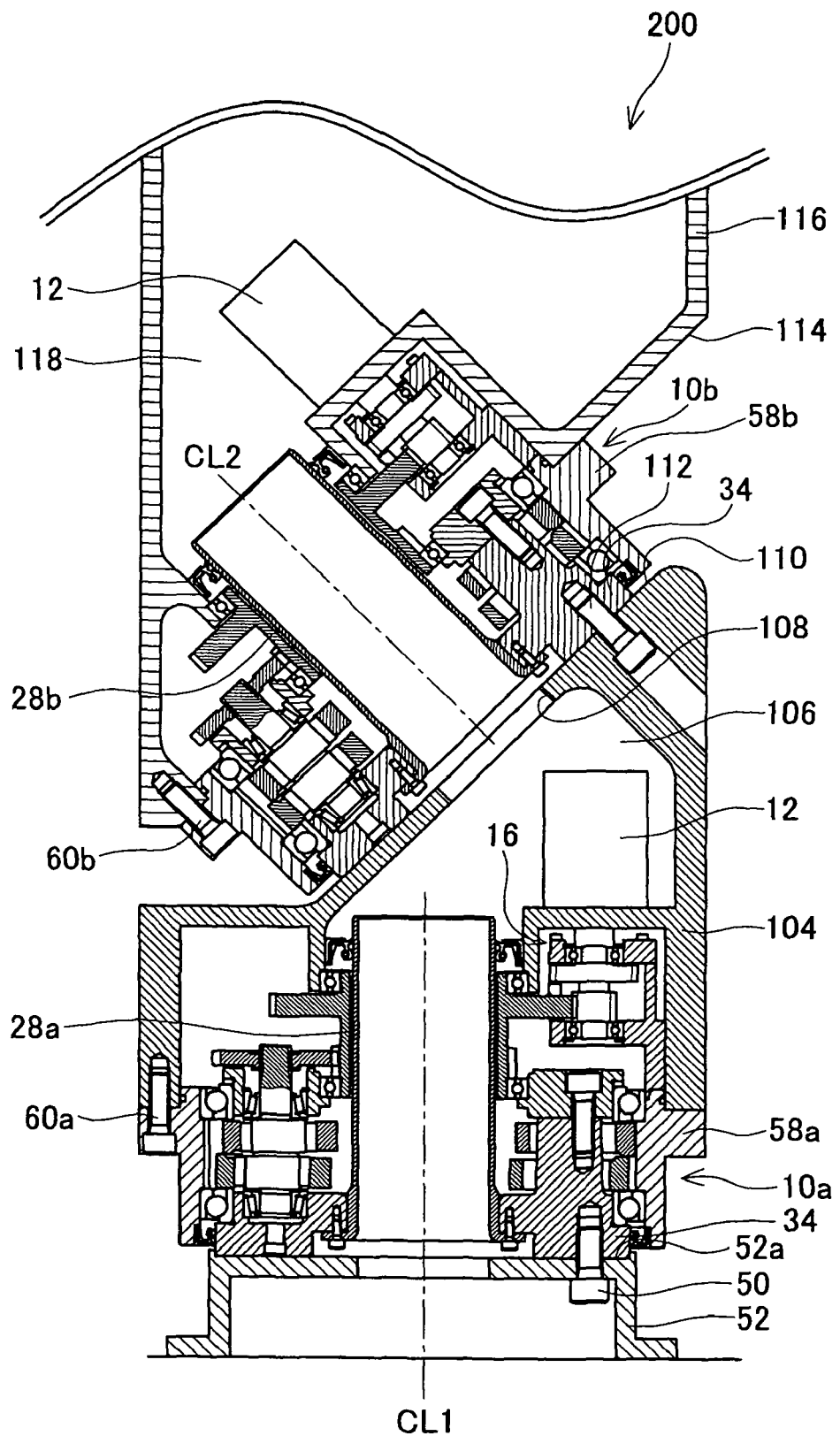
FIG. 6 shows a cross-sectional view of an industrial robot utilizing the reduction gear transmission of the first embodiment.

FIG. 6 shows a cross-sectional view of essential parts of an industrial robot 200 of the present embodiment. Since the configuration of a first reduction gear transmission 10a and of a second reduction gear transmission 10b are identical with that of the reduction gear transmission 10 of the first embodiment, a description thereof has been omitted.

The industrial robot 200 comprises a base part 52, a base side arm 104 that rotates with respect to the base part, and an end side arm 116 that rotates with respect to the base side arm 104. The first reduction gear transmission 10a is disposed between the base part 52 and the base side arm 104, and the second reduction gear transmission 10b is disposed between the base side arm 104 and the end side arm 116. The axis line CL 1 of the input shaft of the first reduction gear transmission 10a and the axis line CL 2 of the input shaft of the second reduction gear transmission 10b intersect without being perpendicular to one another.

An oblique part 110 that is angled with respect to the axis line CL 1 is formed at an end surface of the front step arm 104 at the back step arm 116 side thereof. An oblique part 114 that is angled with respect to the axis line CL 1 is formed at an end surface of the back step arm 116 at the front step arm 104 side thereof. The oblique part 114 is perpendicular to the axis line CL 2.

The carrier 34 that is rotatably supporting an input shaft 28a of the first reduction gear transmission 10a is fixed by the bolt 50 to an end surface 52a of the base part 52 at the base side arm 104 side thereof. An internal gear 58a of the first reduction gear transmission 10a is fixed to the base side arm 104 by a bolt 60a. The carrier 34 that is rotatably supporting the input shaft 28a of the second reduction gear transmission 10b is fixed by a bolt 112 to the oblique part 110 of the base side arm. An internal gear 58b of the second reduction gear transmission 10b is fixed by a bolt 60b to the oblique part 114 of the end side arm 116. The motor 12 of the first reduction gear transmission 10a is housed in a space 106 formed at an inner surface of the oblique part 110 within the base side arm 104. The motor 12 of the second reduction gear transmission 10b is housed in a space 118 within the end side arm 116. A through hole 108 is formed in a central portion of the oblique part 110 of the base side arm 104. Wiring, tubing, etc. can be passed through a through hole formed in the base part 52, a through hole formed in the first reduction gear transmission 10a, the through hole 108, and a through hole formed in the second reduction gear transmission.

Third Embodiment

Figure 8:
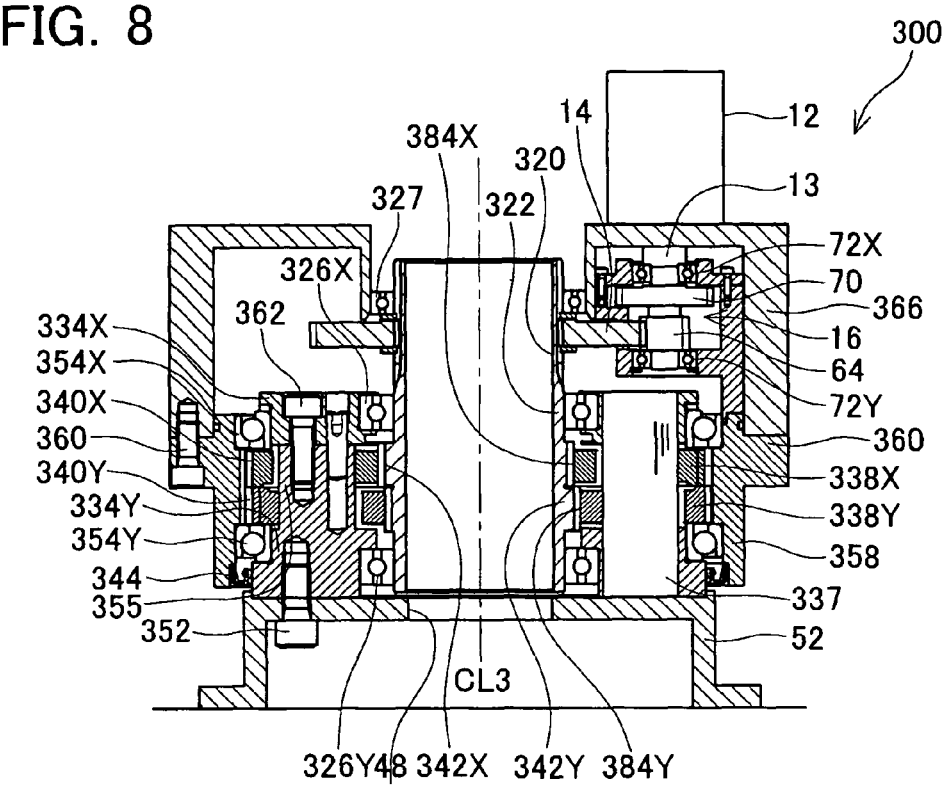
FIG. 8 shows a cross-sectional view of a reduction gear transmission of a third embodiment.

A reduction gear transmission 300 of a third embodiment will be described with reference to FIG. 8. The reduction gear transmission 300 is a variant of the reduction gear transmission 10. An industrial robot can be manufactured utilizing the reduction gear transmission 300. In the description below, only the portions of the reduction gear transmission 300 that differ from the reduction gear transmission 10 will be explained. Members that are the same as in the reduction gear transmission 10 have the same reference numbers applied thereto, or have reference numbers applied thereto in which the last two digits are identical, and a description thereof is omitted.

Eccentric rotation members 342X and 342Y are formed on a part of an input shaft 322. These eccentric rotation members 342X and 342Y have their center at positions offset from an axis line CL 3 of the input shaft 322. The eccentric rotation members 342X and 342Y engage respectively with center through holes 384X and 384Y formed in a center position of external gears 338X and 338Y. Carriers 334X and 334Y are fixed by bolts 362 via a column-shaped part 355. Below, a combination of the carrier 334X and the carrier 334Y may be termed as a carrier 334. A portion of the carrier 334 is fixed by an inner pin 337. The column-shaped part 355 and the inner pin 337 pass through a through hole formed at a position offset from both centers of the external gears 338X and 338Y. A deep groove ball bearing 327 is disposed between the input shaft 322 and the casing 366, and a pair of deep groove ball bearings 326X and 326Y is disposed between the input shaft 322 and the carrier 334. The input shaft 322 and the eccentric rotation members 342X and 342Y are supported by the deep groove ball bearings 327, 326X, and 326Y so as to be capable of rotating with respect to the casing 366 and the carrier 334.

In the reduction gear transmission 300, the centers of the eccentric rotation members 342X and 342Y rotate eccentrically around the axis line CL 3 when the input shaft 322 rotates around the axis line CL 3. When the eccentric rotation members 342X and 342Y rotate eccentrically around the axis line CL 3, the external gears 338X and 338Y revolve orbitally around the axis line CL 3 while meshing with an internal gear 358. In the present embodiment, the carrier 334 is fixed to the pedestal 52 by a bolt 352. When the external gears 338X and 338Y revolve orbitally around the axis line CL 3, the internal gear 358 rotates around the axis line CL 3.

Fourth Embodiment

A reduction gear transmission 400 of a fourth embodiment will be described with reference to FIGS. 9 and 10. FIG. 10 shows a schematic cross-sectional view along the line X-X of FIG. 9. The reduction gear transmission 400 is a variant of the reduction gear transmission 10. An industrial robot can be manufactured utilizing the reduction gear transmission 400. In the description below, only the portions of the reduction gear transmission 400 that differ from the reduction gear transmission 10 will be explained. Members that are the same as in the reduction gear transmission 10 have the same reference numbers applied thereto, or have reference numbers applied thereto in which the last two digits are identical, and a description thereof is omitted.

Figure 9:
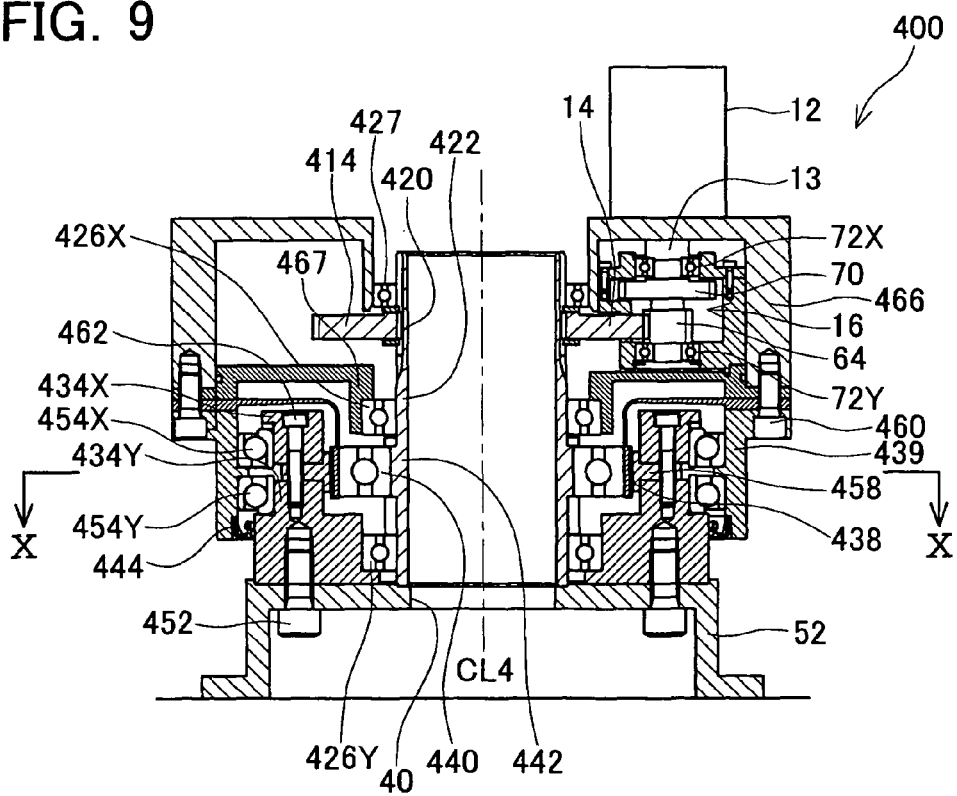
FIG. 9 shows a cross-sectional view of a reduction gear transmission of a fourth embodiment.
Figure 10:
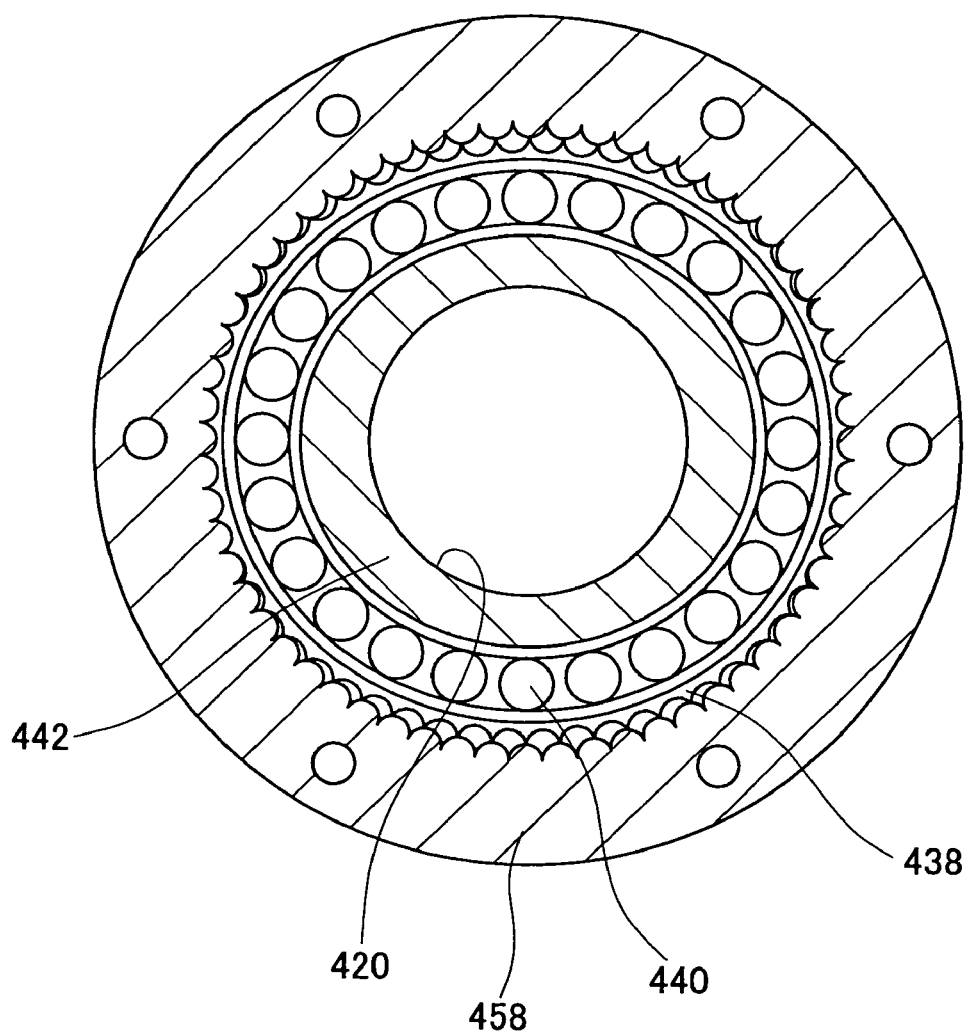
FIG. 10 shows a cross-sectional view along the line X-X of FIG. 9.

As shown in FIGS. 9 and 10, an ellipsoidal rotation member 442 that is perpendicular to an axis line CL 4 is formed on a part of an input shaft 422. An external gear 438 is formed on an outer face of the rotation member 442 via a deep groove ball bearing 440. The external gear 438 engages with the shape of the rotation member 442 and changes shape. An internal gear 458 meshes with the external gear 438 at a position along the major axis of the rotation member 442, and surrounds the external gear 438 while allowing the rotation member 442 to rotate around the axis line CL 4. The number of teeth of the external gear 438 differs from the number of teeth of the internal gear 458.

The internal gear 458 is fixed to carriers 434X and 434Y by bolts 462. Below, a combination of the carrier 434X and the carrier 434Y will be termed a carrier 434. The external gear 438 is fixed to casings 439 and 466 by bolts 460. A pair of angular ball bearings 454X and 454Y is disposed between the carrier 434 and the casing 439. The casing 439 is supported so as to be incapable of rotating with respect to the carrier 434 and incapable of moving in an axial direction.

A deep groove ball bearing 427 is disposed between the input shaft 422 and the casing 466. A deep groove ball bearing 426X is disposed between the input shaft 422 and a support member 467 fixed to the casing 466. A deep groove ball bearing 426Y is disposed between the input shaft 422 and the carrier 434. As a result, the input shaft 422 is supported so as to be capable of rotating with respect to the casings 439 and 466 and the carrier 434.

As shown in FIG. 10, the external gear 438 meshes with the internal gear 458 at a position along the major axis of the rotation member 442. Moreover, in FIG. 10 the casing 439 is not shown. When the input shaft 422 rotates around the axis line CL 4, the rotation member 442 rotates around the axis line CL 4. The external gear 438 engages with the rotation member 442, and meshes with the internal gear 458 at a position along the major axis of the rotation member 442. That is, when the rotation member 442 rotates, the position at which the external gear 438 and the internal gear 458 mesh with each other changes. In the present embodiment, the external gear 438 has two less teeth than the internal gear 458, and the internal gear has sixty teeth. As a result, the internal gear 458 makes one rotation around the axis line CL 4 of the input shaft 422 when the rotation member 422 makes thirty rotations.

Specific examples of the present invention have been described in detail above. However, these are merely illustrations, and do not limit the scope of the claims. The specific examples illustrated above include various modifications and changes that are within the technology disclosed in the present scope of the claims.

In the first embodiment, a case in which the difference in the number of teeth between the external gear and the internal gear was one tooth was exemplified. However, the difference in the number of teeth between the external gear and the internal gear may be two teeth, or may be three or more teeth. This can be selected in accordance with the desired reduction ratio.

In the first embodiment, the through hole is formed in the input shaft, and the cylindrical member passes through the through hole. However, the through hole may be formed in the input shaft, and this input shaft may be passed through the center through hole of the external gear, as in the second and the third embodiments. Furthermore, the cylindrical member may be omitted.

In the second embodiment, an industrial robot having a two-segmented arm that has a base side arm and an end side arm has been shown. However, the industrial robot is not restricted to having a two-segmented arm, and may have an arm having more than two segments, in which the configuration of an aforementioned pair of arms is repeated.

In the first to third embodiments, a case has been described where two external gears are used. However, the number of external gears is not restricted to two. The number of external gears may be one, or may be three or more. It is possible to make the reduction gear transmission more compact by decreasing the number of external gears. Meanwhile, it is possible to improve the rotational balance of the reduction gear transmission by increasing the number of external gears. The number of external gears can be selected in accordance with the aim and intended use of the reduction gear transmission.

Further, the technological components described in the present specification or drawings exhibit technological utility either individually or in various combinations, and are not limited to the combinations disclosed in the claims at the time of application. Furthermore, the technology illustrated in the present specification or the drawings may simultaneously achieve a plurality of objects, and has technological utility by achieving one of those objects.

The invention claimed is:

1. A reduction gear transmission comprising:
   a motor gear fixed to an output shaft of a motor;
   an intermediate shaft extending parallel to the output shaft of the motor;
   a first gear fixed to the intermediate shaft and meshing with the motor gear;
   a second gear fixed to the intermediate shaft;
   an input shaft extending parallel to the output shaft of the motor and having a through hole formed along an axis line of the input shaft, wherein the input shaft has an input gear meshing with the second gear and eccentrically rotates an eccentric rotation member in accordance with the rotation of the input gear;
   an external gear having a center through hole formed at a center position of the external gear, the external gear engaging with the eccentric rotation member, wherein the external gear revolves orbitally around the axis line of the input shaft when the input shaft rotates;
   an internal gear having a number of teeth differing from a number of teeth of the external gear, and the internal gear surrounding the external gear while the teeth of the internal gear are meshing with the external gear, and the internal gear allowing the orbital revolution of the external gear, wherein:
      when viewed from the axis line of the input shaft, the motor gear and the first gear mesh at a position which is offset from a straight line formed by connecting an axis line of the intermediate shaft and the axis line of the input shaft, and
      the output shaft of the motor and the intermediate shaft are arranged within an inner diameter of the internal gear; and
   a crankshaft that extends parallel to the input shaft and has a fourth gear; wherein:
      the input shaft has on an outer face of the input shaft a third gear meshing with the fourth gear,
      a second through hole which is offset from the center through hole of the external gear is formed on the external gear,
      the crankshaft, which comprises the eccentric rotation member, passes through the second through hole, and
      the eccentric rotation member is formed on the crankshaft and engages with the external gear inside the second through hole.

2. The reduction gear transmission according to claim 1, wherein the motor, the first gear, and the second gear are arranged within a range that is outside the through hole formed in the input shaft and is within an outer diameter of the internal gear.

3. A reduction gear transmission comprising:
   a motor gear fixed to an output shaft of a motor;
   an intermediate shaft extending parallel to the output shaft of the motor;
   a first gear fixed to the intermediate shaft and meshing with the motor gear;
   a second gear fixed to the intermediate shaft;
   an input shaft extending parallel to the output shaft of the motor and having a through hole formed along an axis line of the input shaft, wherein the input shaft has an input gear meshing with the second gear and eccentrically rotates an eccentric rotation member in accordance with the rotation of the input gear;
   an external gear having a center through hole formed at a center position of the external gear, the external gear engaging with the eccentric rotation member, wherein the external gear revolves orbitally around the axis line of the input shaft when the input shaft rotates; and
   an internal gear having a number of teeth differing from a number of teeth of the external gear, and the internal gear surrounding the external gear while the teeth of the internal gear are meshing with the external gear, and the internal gear allowing the orbital revolution of the external gear, wherein:
      when viewed from the axis line of the input shaft, the motor gear and the first gear mesh at a position which is offset from a straight line formed by connecting an axis line of the intermediate shaft and the axis line of the input shaft,
      the output shaft of the motor and the intermediate shaft are arranged within an inner diameter of the internal gear, and
      the eccentric rotation member is formed on the input shaft and engages with the external gear inside the center through hole.

* * * * *